(12) United States Patent
Kuga

(10) Patent No.: US 7,502,219 B2
(45) Date of Patent: Mar. 10, 2009

(54) THIN DISPLAY DEVICE

(75) Inventor: Tomio Kuga, Tochigi (JP)

(73) Assignee: Sharp Kabushiki Kaisha, Osaka (JP)

( * ) Notice: Subject to any disclaimer, the term of this patent is extended or adjusted under 35 U.S.C. 154(b) by 476 days.

(21) Appl. No.: 10/528,016

(22) PCT Filed: Sep. 12, 2003

(86) PCT No.: PCT/JP03/11721

§ 371 (c)(1),
(2), (4) Date: Mar. 16, 2005

(87) PCT Pub. No.: WO2004/028151

PCT Pub. Date: Apr. 1, 2004

(65) Prior Publication Data

US 2006/0022108 A1     Feb. 2, 2006

(30) Foreign Application Priority Data

Sep. 17, 2002 (JP) ............................ 2002-270688
Sep. 17, 2002 (JP) ............................ 2002-270744
Sep. 17, 2002 (JP) ............................ 2002-270752

(51) Int. Cl.
*G06F 1/16* (2006.01)

(52) U.S. Cl. .................... 361/681; 361/683; 248/918; 248/919; 248/349.1

(58) Field of Classification Search ......... 361/679–683; 248/917–923, 349.1
See application file for complete search history.

(56) References Cited

U.S. PATENT DOCUMENTS

| | | | |
|---|---|---|---|
| 4,555,990 A | * 12/1985 | Egawa .......................... 108/20 |
| 4,640,485 A | * 2/1987 | Day et al. .................... 248/422 |
| 5,124,805 A | * 6/1992 | Chung et al. ................ 348/838 |
| 5,749,556 A | * 5/1998 | Matsuoka et al. ........ 248/349.1 |
| 6,095,476 A | * 8/2000 | Mathis ....................... 248/422 |

FOREIGN PATENT DOCUMENTS

| | | |
|---|---|---|
| EP | 1 176 356 A2 | 1/2002 |
| JP | 57-178765 A | 11/1982 |
| JP | 63-61884 | 4/1988 |
| JP | 64-31246 | 2/1989 |
| JP | 3-204288 A | 9/1991 |
| JP | 3-247185 A | 11/1991 |
| JP | 6-261268 A | 9/1994 |
| JP | 8-314386 A | 11/1996 |

(Continued)

*Primary Examiner*—Jayprakash N Gandhi
*Assistant Examiner*—Anthony Q Edwards
(74) *Attorney, Agent, or Firm*—Birch, Stewart, Kolasch & Birch, LLP

(57) ABSTRACT

A position adjusting mechanism, a rotation-axle bearing mechanism, and a rotation-speed reduction mechanism for a flat display apparatus. The rotation-speed reduction mechanism comprises a position adjusting mechanism that includes one or more means for securely attaching a stand and a main body unit of the apparatus to one another, and a position adjusting means for adjusting the mounting position of the stand and main body unit. The rotation-axle bearing mechanism comprises a radial bearing and a thrust bearing for supporting a rotation axle between a display screen unit and the stand. The rotation-speed reduction mechanism reduces the speed of rotation between the display screen unit and the stand upon application of a rotation load exceeding a certain level.

9 Claims, 13 Drawing Sheets

FOREIGN PATENT DOCUMENTS

| | | |
|---|---|---|
| JP | 8-331485 A | 12/1996 |
| JP | 09-039675 | 2/1997 |
| JP | 10-32771 A | 2/1998 |
| JP | 10-97197 A | 4/1998 |
| JP | 10-267044 A | 10/1998 |
| JP | 2000-347582 A | 12/2000 |
| JP | 2001-194648 A | 7/2001 |
| JP | 2001-236024 A | 8/2001 |
| JP | 2001-347893 | 12/2001 |

* cited by examiner

820

THIN DISPLAY DEVICE

TECHNICAL FIELD

The present invention relates to a rotation adjusting mechanism for a stand-type flat display apparatus. In particular, it relates to a position adjusting mechanism for rotating a display screen unit of a stand-type flat display apparatus equipped with a single-axle type rotation mechanism while maintaining the horizontal position of the display screen unit.

The invention further relates to a stand rotation mechanism for a flat display apparatus, particularly to a rotation-axle bearing mechanism for allowing for the rotation of a display unit of a flat display apparatus in a mounting position such that the center of the weight of the main body of the flat display apparatus does not correspond to the central axis of the stand.

The invention further relates to a stand rotation mechanism for a flat display apparatus, particularly to a rotation-speed reduction (or torque limiter) mechanism in the rotation mechanism for reducing the input rotation speed of a rotation motor or the like and then supplying an output to gears or the like, and also for protecting the apparatus from excessive rotation load.

BACKGROUND ART

In recent years, stand-type flat display apparatuses with a display screen comprising an LCD (liquid crystal display), a plasma display, or an EL (electronic luminescence) display, are becoming increasingly common. In particular, there is an increasing need for large-sized stand-type flat display apparatuses equipped with a display screen size of 30 inches or larger. A variety of such products have been developed for household or business purposes.

In these stand-type flat display apparatuses, a display screen unit includes an LCD, plasma or EL display, and a main body unit includes an amplifier unit, power supply, drive circuit and other devices. The display screen unit and the main body unit are typically supported by a stand including a leg extending horizontally such that the display screen unit stands substantially vertically with respect to the floor. The stand further includes a rotation mechanism by which the main body unit can be axially supported in a freely rotatable manner.

FIG. 1 shows an elevational view of an example of the above-described stand-type flat display apparatus. A flat display apparatus 100 is a console-type flat display apparatus including a display screen unit 110, a main body unit 120, and a stand 130. The term "console type" refers to the type of flat display apparatus in which the main body unit 120 is composed of a control unit 121 including a power supply, a drive circuit and a control circuit and an amplifier unit 122, and in which the main body unit 120 is integrated with the display screen unit 110.

The display screen unit 110 includes a display screen 111 such as an LCD, plasma or EL display. The main body unit 120 includes the control unit 121 and amplifier unit 122. The main body unit 120 is integrated with the display screen unit 110 and axially supported by the stand 130. The stand 130 is comprised of a stand support column 131 and a stand base 132. The stand support column 131 has a rotation mechanism by which the main body unit 120 can be supported in a freely rotatable manner.

(1) As an example of the rotation mechanism for the above-described stand-type flat display apparatus, JP Patent Publication (Kokai) No. 08-331485 A (1996) discloses a rotation mechanism for television sets. In this rotation mechanism, sliding rollers 7 are disposed at ends of each side of the bottom of the television main body unit for supporting the weight thereof and allowing the same to be rolled. The sliding rollers 7 are adapted to roll on the upper surface of a television stand 13, thus allowing the television main body unit to be rotated.

It is difficult, however, to apply this television rotation mechanism to the rotation mechanism for the stand-type flat display apparatus. This is due to the fact that the aforementioned mechanism, in which the television main body unit and the rollers are adapted to roll, requires certain width and depth in the television main body unit and the television stand. Further, it creates a gap between the television main body unit and the television stand and thus exposes the inside of the television stand as the television main body unit is rotated.

(2) Referring to FIG. 1, the display screen unit 110 includes the display screen 111 such as an LCD, plasma or EL display. The main body unit 120 includes the control unit 121 and amplifier unit 122. The main body unit 120 is integrated with the display screen unit 110 and axially supported by the stand 130. The stand 130 is composed of the stand support column 131 and stand base 132. The stand support column 131 has a rotation mechanism by which the main body unit 120 can be supported in a freely rotatable manner.

As a conventional example of this rotation mechanism, JP Patent Publication (Kokai) No. 10-32771 shows a rotation mechanism in which a support column 7 supporting a display 3 and a rotation platform 2 are supported on a base 1. A thrust bearing 8 is disposed between the base 1 and the rotation platform 2 in order to allow the display 3 to be rotated.

If this rotation mechanism were to be applied to the stand-type flat display apparatus, a structure would have to be adopted such that the display screen unit and the main body unit are axially supported by the support column of the stand in a freely rotatable manner.

(3) In the stand-type flat display apparatus as shown in FIG. 1, the rotation mechanism in the stand 130 is typically equipped with a drive motor, for example, to allow for an automatic rotation of the display screen unit 110 and the main body unit 120.

In this type of automatic rotation mechanism, a means is provided to reduce the rotation output of the drive motor at a certain reduction ratio. Specifically, a certain amount of load is put on the rotation axle being rotated so that the rotation can come to a stop when the drive motor is stopped. By appropriately selecting the reduction ratio, the automatic rotation speed can be controlled. For example, a winch mechanism is commonly provided in the worm unit connected to the drive motor.

Similar rotation-speed reduction mechanisms in conventional display apparatuses are disclosed in JP Utility Model Publication (Kokai) No. 63-61884 A (1988) and JP Utility Model Publication (Kokai) No. 64-31246 U (1989).

The former, JP U.M. Kokai 63-61884, discloses a rotating cabinet in which a cabinet main body unit is placed on a pedestal in a freely rotatable manner. A bevel gear and an output gear are adapted to be engaged due to the weight of the cabinet main body unit, and a reducing gear train is arranged in a vertical direction and is driven.

The latter, JP Utility Model 64-31246, discloses a turning mechanism comprising a gear that receives the rotation of a gear mechanism, a bevel gear adapted to resiliently engage the gear on the axis side, and a clutch mounted on an upper platform in such a manner as to engage the bevel gear. In this turning mechanism, the gear mechanism and the motor are protected from damage in the event of an excessive load torque.

DISCLOSURE OF THE INVENTION

Regarding the Position Adjusting Mechanism of the Flat Display Apparatus

As the stand-type flat display apparatus becomes larger in size, the display screen correspondingly becomes larger and thus a considerable weight must be supported by the stand. Conventionally, a large-sized display screen is supported by two stands via the left and right edges of the display screen. Alternatively, a trapezoidal stand is used to increase the area of contact between the stand and the display screen. There is, however, a demand for allowing a large-sized display screen to be supported with a single stand.

At the same time, the single-axle stand must be capable of rotating the display screen unit in a horizontal manner. In the case of a large-sized stand-type flat display apparatus, in particular, even a slight inclination in a horizontal direction results in a large difference in height between the left and right edges of the wide display screen unit, making it appear to the user as if the display is greatly inclined horizontally. For example, it is known that in the case of a certain large-sized LCD television, the user can recognize a tilting if there is an inclination of 20' (approximately ⅓ degrees) or more horizontally.

A stand-type flat display apparatus is typically designed such that its main body unit can be rotated relative to the stand either manually or automatically. The horizontal position of the main body unit must be stabilized such that it does not swing either left or right during rotation.

The horizontal position can be easily adjusted by supporting the display unit with two stands or supporting axles. However, if the display unit is to be supported on the stand with a single supporting axle, it is inevitable in reality that slight variations are produced in the size of the individual components or that slight errors are introduced into the positioning of individual components during assembly, no matter how precisely the horizontal positioning of the main body unit is designed. Thus, it is extremely difficult to manufacture a stand-type flat display apparatus in which the horizontal positioning of the main body unit is precisely maintained according to design.

Thus, it is an object of the invention to provide a position adjusting mechanism for a stand-type flat display apparatus equipped with a single-axle rotation mechanism, whereby the display screen unit can be retained horizontally.

Regarding the Rotation-Axle Bearing Mechanism in the Flat Display Apparatus

The stand-type flat display apparatus is quite heavy due to the materials such as glass used in the entire liquid crystal panel on the display screen unit. Further, as the LCD panel portion and the casing are constructed in an integral manner, the weight of the main body is heavier the larger the size of the display apparatus is. In addition, in the case of a stand for a flat display apparatus, there is the problem that the flat display apparatus cannot be made to look thinner unless the stand unit is made thinner than the main body unit when looked at sideways.

For these reasons, if the main body display unit is attached towards the front of the screen farther than the center of axle of the stand unit, the center of gravity of the display screen unit and main body unit is inclined greatly towards the front. As a result, the center of gravity of the display screen unit and main body unit is greatly displaced from the center of rotation of the stand.

Particularly, when the display screen unit of the flat display apparatus is positioned forwardly of the periphery of the rotation mechanism, the center of gravity of the display screen unit would be located forwardly of the periphery of the rotation mechanism, resulting in a greater displacement between the center of rotation of the stand and the center of gravity.

If the display screen unit and the main body unit are rotated in this condition, a load would be put on the bearing of the rotation mechanism in an irregular manner, thus interfering with a smooth rotation of the display screen unit and the main body unit. While in the aforementioned rotation mechanism of JP 08-331485 (FIG. 6) a sufficient stability is provided by the thrust bearing in the direction of gravity, there is no consideration given to the displacement of the center of gravity of the display screen unit and main body unit as they rotate. If such a rotation mechanism is employed in the stand-type flat display apparatus, the axle and bearing of the rotation mechanism would wobble vertically, thus preventing a smooth rotation of the display screen unit and main body unit.

Thus, it is an object of the invention to provide a rotation mechanism for a stand-type flat display apparatus in which the center of gravity of the display screen unit and main body unit is distanced from the center of rotation of the rotation mechanism of the stand, whereby a smooth and stable rotation can be ensured.

Regarding the Rotation-Speed Reduction Mechanism in the Flat Display Apparatus

When the stand-type flat display apparatus shown in FIG. 1 is actually rotated automatically, the rotation could be impeded by a variety of reasons. For example, if the display screen unit 110 and the main body unit 120 come into contact with an obstacle, they might not be able to rotate further. It is also possible that the user might try to terminate the rotation by hand, or that he or she might attempt to start rotating the display screen unit 110 and the main body unit 120 with an excessive force.

If such an abnormal load is applied to the rotation mechanism, an excessive load would be put on the gear and motor and other components, particularly during automatic rotation, possibly causing damage to such components.

Thus, it is another object of the invention to provide a stand-type flat display apparatus equipped with a rotation mechanism in which the components of the rotation mechanism are protected from a potentially excessive rotation load or abnormal rotation load.

Regarding the Position Adjusting Mechanism of the Flat Display Apparatus

The present invention provides an apparatus comprising a main body unit and a stand unit having a single-axle rotation unit for supporting the main body unit, the apparatus further comprising means for adjusting the inclination of the horizontal position of the main body unit where the stand unit and the main body unit are connected to one another.

The present invention further provides a flat display apparatus comprising a main body unit with a display screen and a stand unit with a single rotation axle for supporting the main body unit, the apparatus further comprising means for adjusting the inclination of the horizontal position of the main body unit where the stand unit and the main body unit are connected.

Preferably the flat display apparatus further comprises means for temporarily securing the stand unit and the main body unit and means for fully securing the stand unit and the main body unit where the stand unit and the main body unit are connected, wherein the stand unit and the main body unit are temporarily secure to one another and then the inclination of the main body unit is adjusted by the inclination adjusting means, before the stand unit and the main body unit are fully secured to one another.

According to the present invention, the inclination-adjusting means comprises an eccentric member disposed where the stand unit and the main body unit are connected.

The present invention further provides a flat display apparatus comprising a main body unit with a display screen and a stand unit with a single rotation axle for supporting the main body unit, the apparatus further comprising: connecting means for connecting the stand unit and the main body unit, wherein the connecting means comprises a securing means for securing the stand unit and the main body unit to one another, and inclination adjusting means for adjusting the inclination of the horizontal position of the main body unit.

According to the present invention, the connecting means further comprises a positioning pin for positioning the stand unit and the main body unit.

The present invention further provides a flat display apparatus comprising a main body unit with a display screen and a stand unit with a single rotation axle for supporting the main body unit, the apparatus further comprising a connecting member for connecting the stand unit and the main body unit, the connecting member comprising: a securing opening for allowing the stand unit and the main body unit to be secured to one another with a screw; and an inclination adjusting opening for adjusting the inclination of the horizontal position of the main body unit, wherein the inclination of the main body unit can be adjusted by inserting an eccentric cam into the inclination adjusting opening and rotating the eccentric cam.

Regarding the Rotation Axle Bearing Mechanism of the Flat Display Apparatus

The present invention provides a main body unit with a display screen, a stand unit, and a rotation mechanism for rotating the main body unit horizontally with respect to the stand unit, wherein the rotation mechanism comprises a plurality of kinds of bearings for supporting a rotation axle.

According to the present invention, the plurality of kinds of bearings comprise a combination of a radial bearing and a thrust bearing.

According to the present invention, the plurality of kinds of bearings are mounted towards the top and bottom of the rotation axle.

According to the present invention, the center of gravity of the main body unit is located outside a reference rotation periphery defined by the thrust bearing.

The present invention further provides a flat display apparatus comprising a rotation mechanism made up of an upper unit and a lower unit, wherein the lower unit has a single rotation axle secured thereto, and the upper unit has a plurality of kinds of radial bearings supporting the rotation axle, the upper and lower units being capable of rotating relative to one another.

According to the present invention, a stopper is disposed near the tip of the rotation axle, the stopper being secured in place while applying a certain force in the axial direction.

Regarding the Rotation Speed Reduction Mechanism of the Flat Display Apparatus

The present invention provides a flat display apparatus comprising a main body unit with a display screen, a stand unit, and a rotation mechanism for rotating the main body unit horizontally with respect to the stand unit, wherein the rotation mechanism is adapted to reduce the speed of rotation upon application of a rotation load exceeding a certain level.

According to the present invention, the rotation mechanism comprises two ore more gears and a clutch mechanism for reducing the speed of rotation between the individual gears upon application of a rotation load exceeding a certain level.

According to the present invention, the rotation mechanism comprises two or more gears, of which two or more gears are torque-limiting gears that are adapted to reduce the speed of rotation upon application of a rotation load exceeding a certain level.

According to the present invention, the torque-limiting gears include an upper gear and a lower gear, wherein the upper and lower gears are adapted to frictionally slide upon one another upon application of a rotation load exceeding a certain level.

According to the present invention, the torque-limiting gears include a gear base, an upper gear secured to the gear base, and a lower gear disposed between the gear base and the upper gear, wherein the gear base has a friction member disposed on the surface thereof facing the lower gear, and wherein a resilient member is disposed between the upper and lower gears, the resilient member being adapted to press the lower gear against the friction member such that the lower gear and the gear base frictionally slide upon one another.

According to the present invention, the rotation mechanism includes a drive motor and is capable of automatic rotation.

Preferably the flat display apparatus further comprises means for receiving remote operation, wherein the rotation of the rotation mechanism is controlled by remote operation.

According to the present invention, the rotation mechanism includes a position sensor and is capable of recognizing its own rotation position.

According to the present invention, the rotation mechanism is adapted to reduce the speed of rotation between the motor and the gears or between the gears, the rotation mechanism further comprising a torque-limiting gear, wherein the speed of rotation is reduced as an upper gear and a lower gear of the torque-limiting gear frictionally slide upon one another.

According to the present invention, the torque-limiting gear includes a gear base to which the upper gear is secured, and wherein the lower gear is disposed between the gear base and the upper gear, wherein the gear base has a friction member disposed on the surface thereof facing the lower gear, and a resilient member is disposed between the upper and lower gears, the resilient member being adapted to press the lower gear against the friction member such that the lower gear and the gear base frictionally slide upon one another.

According to the present invention, wherein the display screen includes a liquid crystal display, a plasma display, or an EL display.

BEST MODE FOR CARRYING OUT THE INVENTION

The best modes for carrying out the invention will be hereafter described by referring to the attached drawings.

FIGS. 1 to 15 show various embodiments of the invention wherein like elements with basically identical structure and function are numbered alike.

Figure 1A:
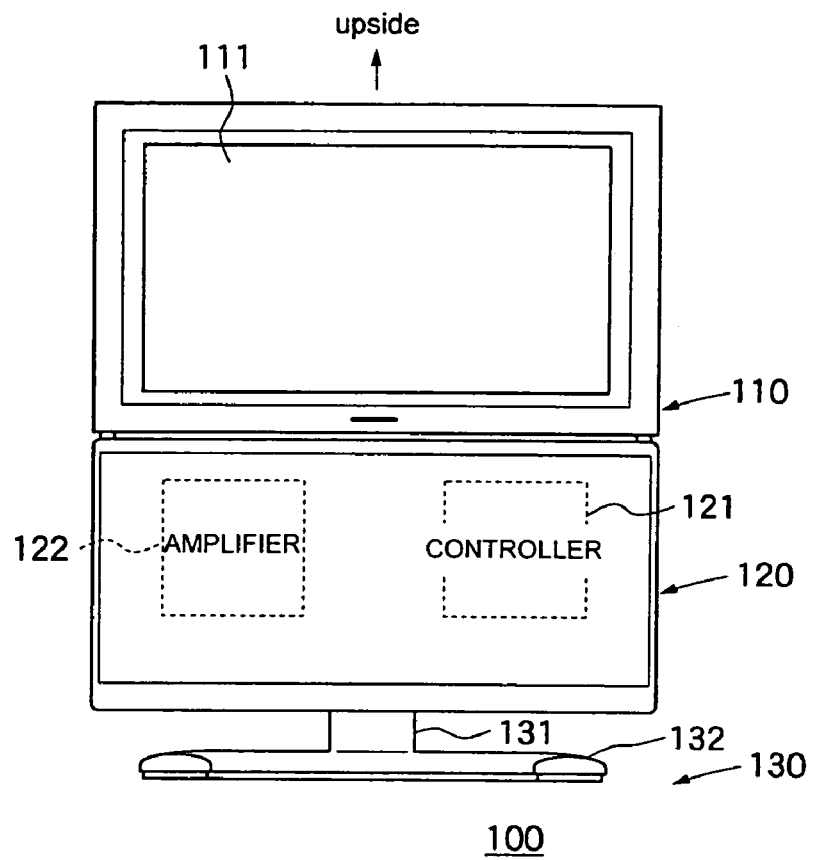
FIG. 1 is a front elevational view of an example of a stand-type flat display apparatus.
Figure 1B:
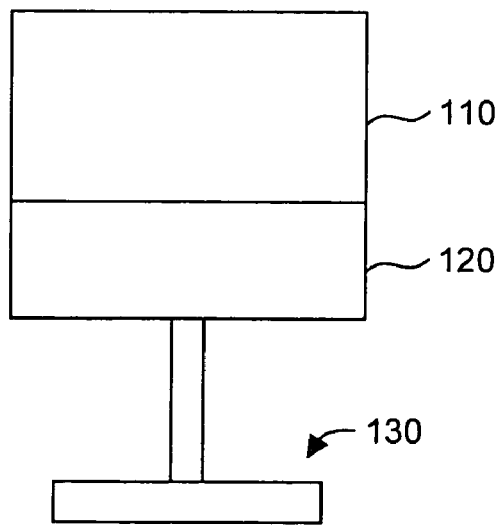
Figure 1C:
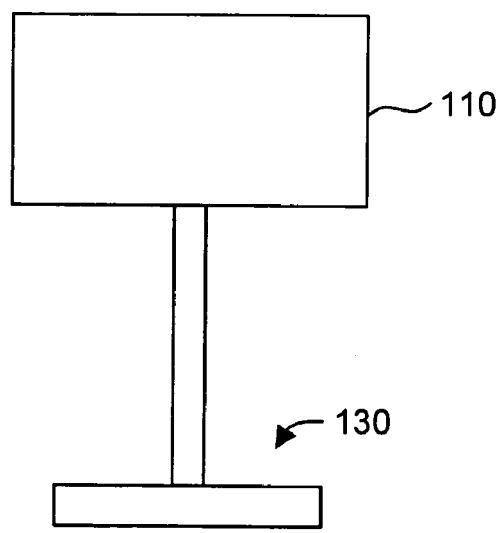

FIG. 1 shows a frontal elevation of an example of the stand-type flat display apparatus according to the invention. FIG. 1(a) shows an example where a display screen unit 110 and a main body unit 120 are supported by a stand unit 130. Another example shown in FIG. 1(b) is similar to the example of FIG. 1(a) except that the leg of the stand unit 130 is made longer. In another example shown in FIG. 1(c), the main body unit 120 is mounted behind the display screen unit 110 in an integral manner.

Figure 2A:
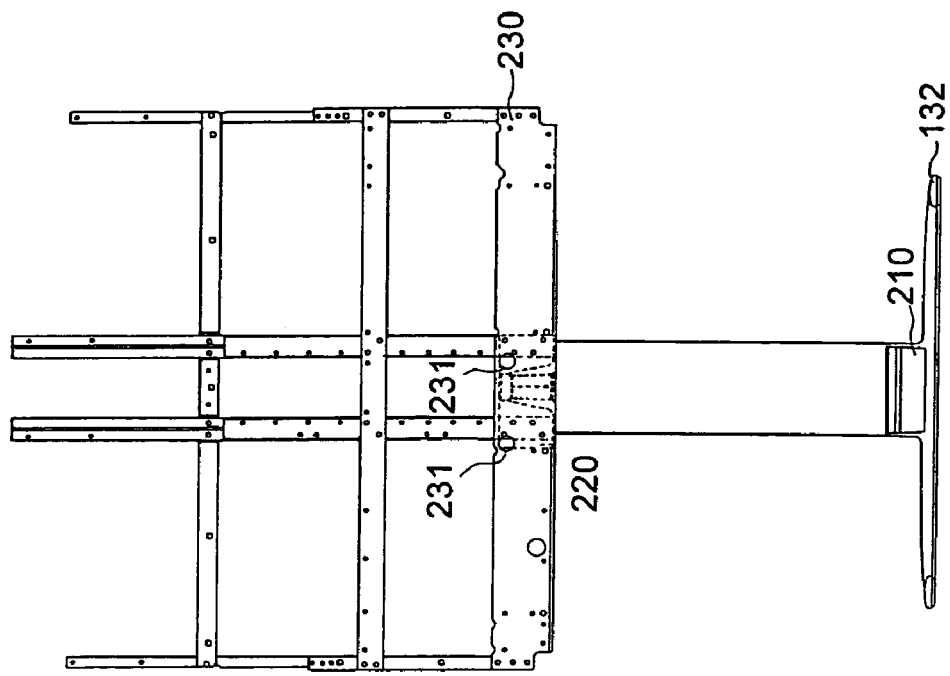
FIG. 2 shows the structure of a frame supporting a display screen unit and a main body unit of the stand-type flat display apparatus shown in FIG. 1.
Figure 2B:
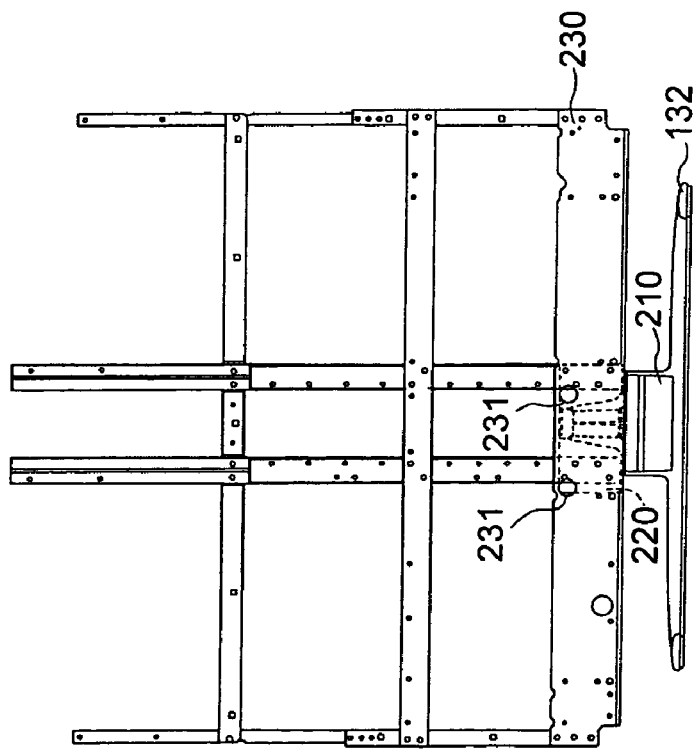

FIG. 2 shows the frame structure for supporting the display screen unit and main body unit of the stand-type flat display apparatus shown in FIG. 1 and the rotation mechanism for allowing the rotation of the display screen unit and main body unit thereof. As shown in FIG. 2, in this stand-type flat display apparatus, an aluminum frame 230 is supported via a mounting angle 220 by a rotation unit 210 of the stand in a freely rotatable manner.

FIGS. 2(a) and (b) show examples corresponding to FIGS. 1(a) and (b).

FIRST EMBODIMENT

Flat Display Apparatus Equipped with Position Adjusting Mechanism

The position adjusting mechanism of the flat display apparatus according to the present embodiment is used at a stand-supported portion of the stand-type flat display apparatus shown in FIGS. 1 and 2. By the position adjusting mechanism, the rotation unit 210 and the mounting angle 220 securely attached thereto are positioned and secured to the aluminum frame 230.

Figure 3A:
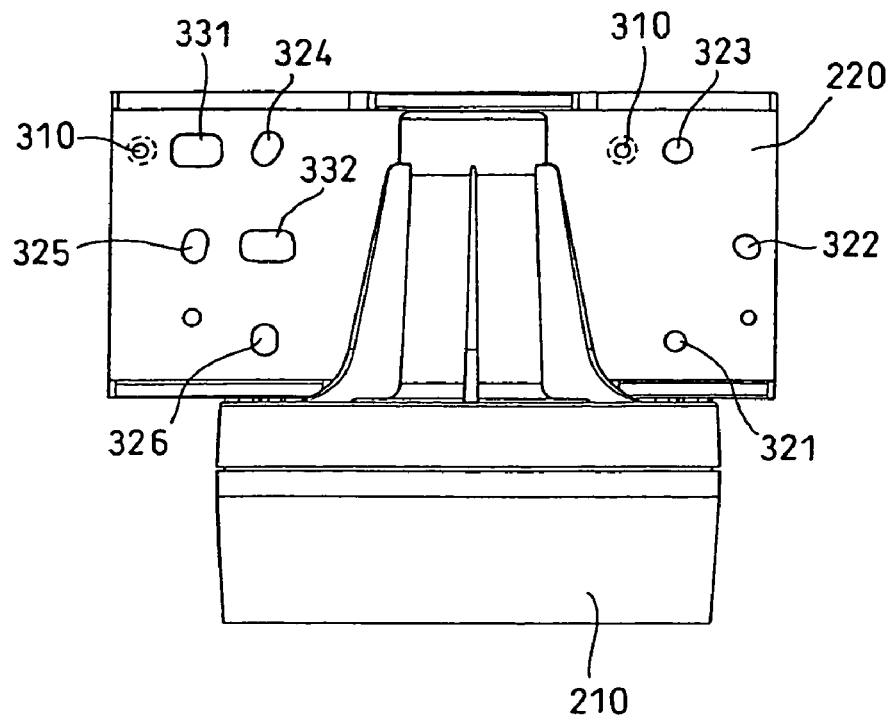
FIG. 3 is an enlarged rear view of a rotation unit and a mounting angle that are used in a position adjusting mechanism of the stand-type flat display apparatus according to a first embodiment of the invention.
Figure 3B:
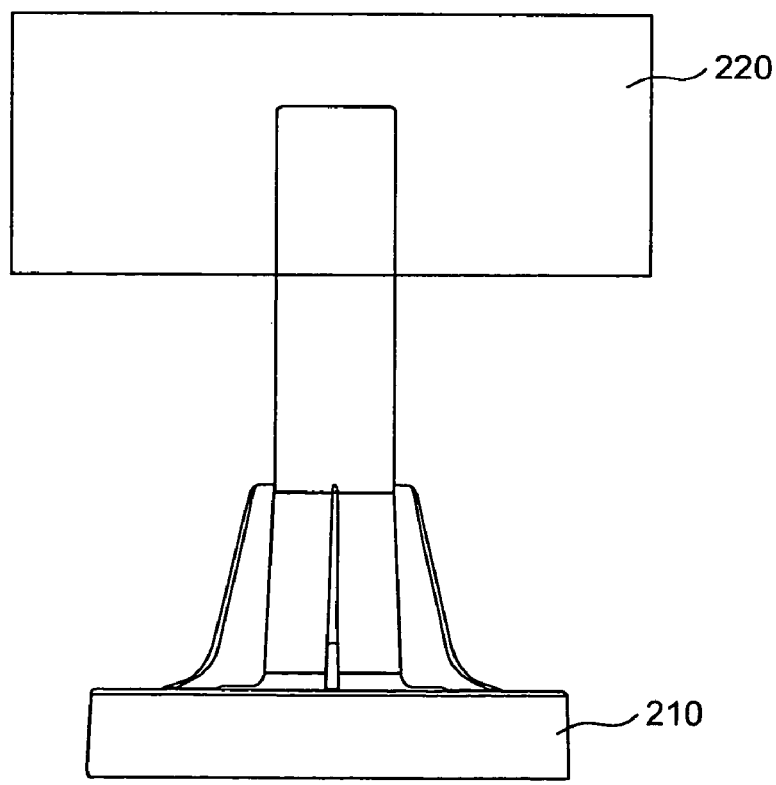
Figure 4:
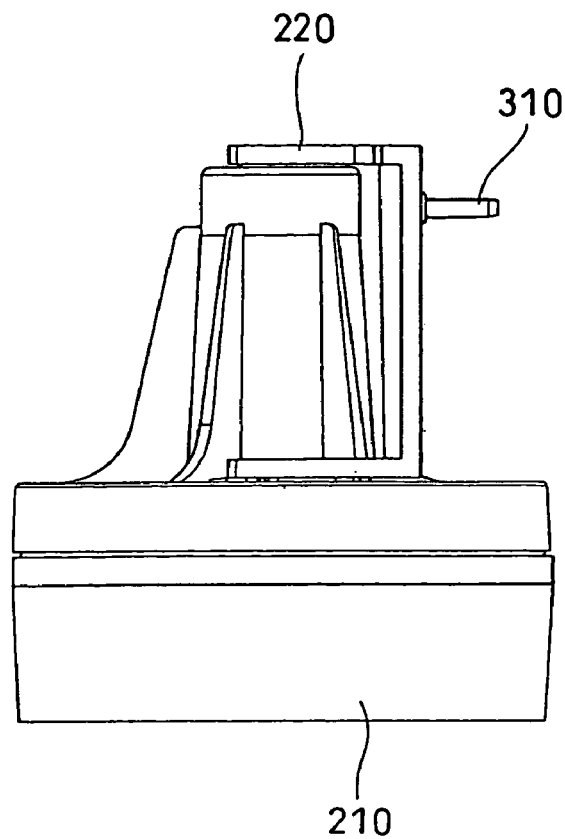
FIG. 4 is an enlarged side view of the rotation unit and the mounting angle that are used in the position adjusting mechanism of the stand-type flat display apparatus according to the first embodiment.
Figure 5:
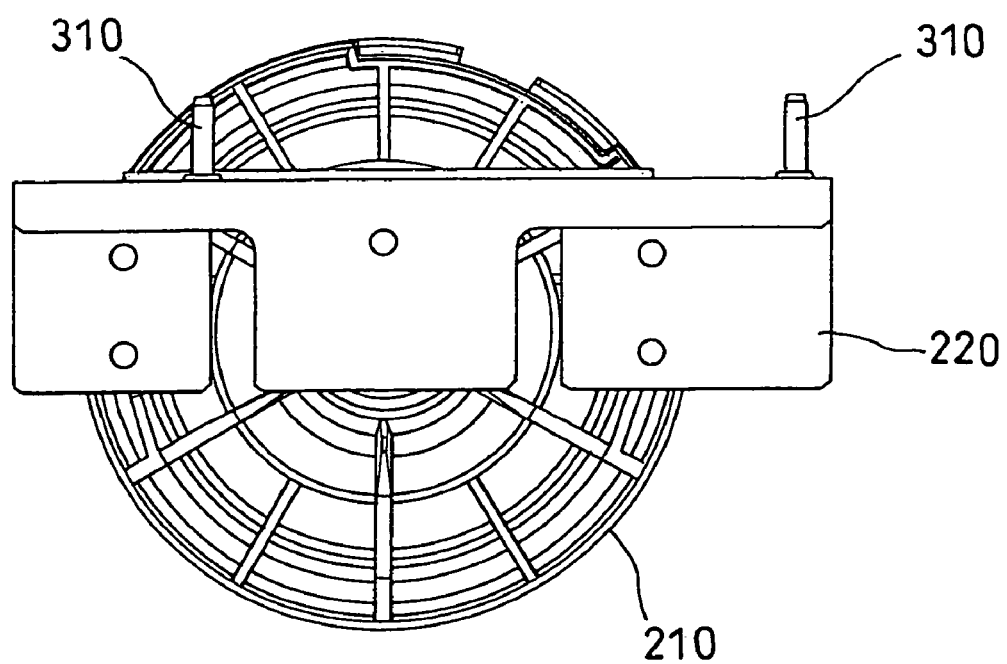
FIG. 5 is an enlarged top view of the rotation unit and the mounting angle that are used in the position adjusting mechanism of the stand-type flat display apparatus according to the first embodiment.

FIGS. 3, 4 and 5 are rear, side view and top views, respectively, of the rotation unit 210 and mounting angle 220 of the stand shown in FIG. 2. FIGS. 3(a) and (b) show examples corresponding to FIGS. 1(a) and (b), respectively.

Referring to FIGS. 3 to 5, the mounting angle 220 includes positioning pins 310, fixing openings 321 to 326, and position adjusting openings 331 to 332. The positioning pins 310 are adapted to engage with bosses 231 (see FIG. 2) extended from a front panel (made of plastic) via the aluminum frame 230, such that the mounting angle 220 can be roughly positioned when attached to the aluminum frame 230. The fixing openings 321 to 326 and the position adjusting openings 331 and 332 are adapted to accommodate screws for fine-adjusting the mounting positions of the mounting angle 220 and the aluminum frame 230, as will be described later.

Hereafter the mounting of the rotation unit 210, the mounting angle 220 and the aluminum frame 230 will be described. FIG. 6 shows a top view of the rotation unit 210, the mounting angle 220 and the aluminum frame 230 as assembled.

Figure 6A:
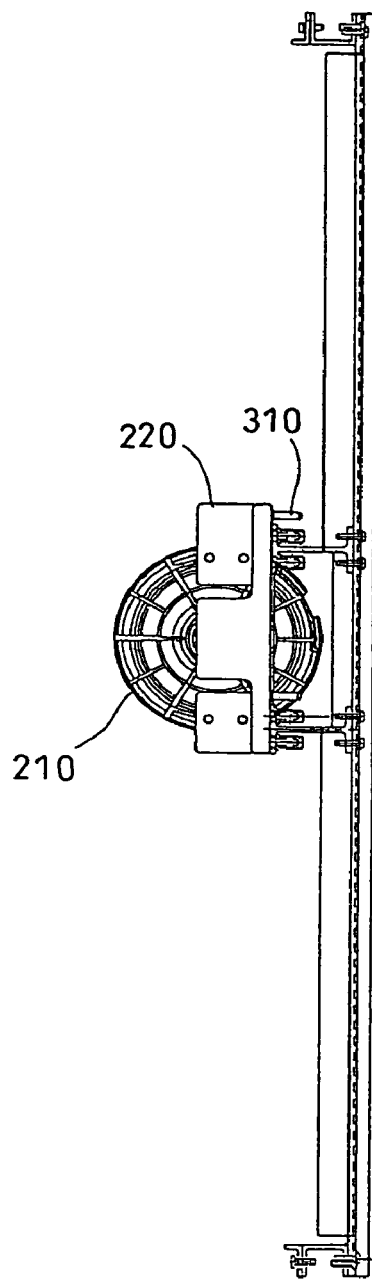
FIG. 6 is a top view of the rotation unit, mounting angle and an aluminum frame as assembled in the position adjusting mechanism of the stand-type flat display apparatus according to the first embodiment.
Figure 7A:
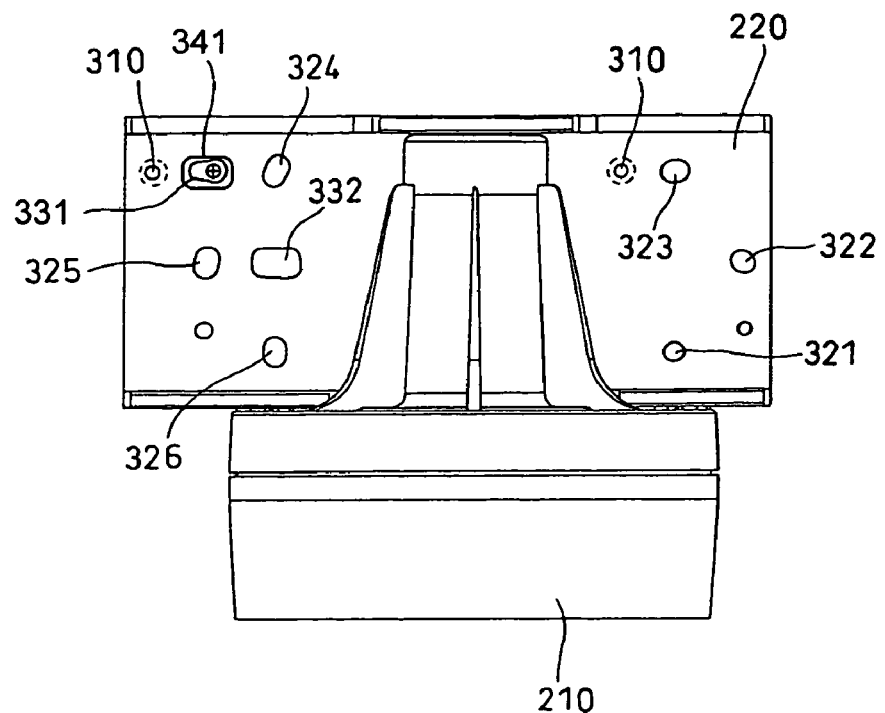
FIG. 7 is a rear view of the rotation unit and the mounting angle that are used in the position adjusting mechanism, similar to FIG. 3, but in which an eccentric cam is inserted in a position adjusting opening.
Figure 7B:
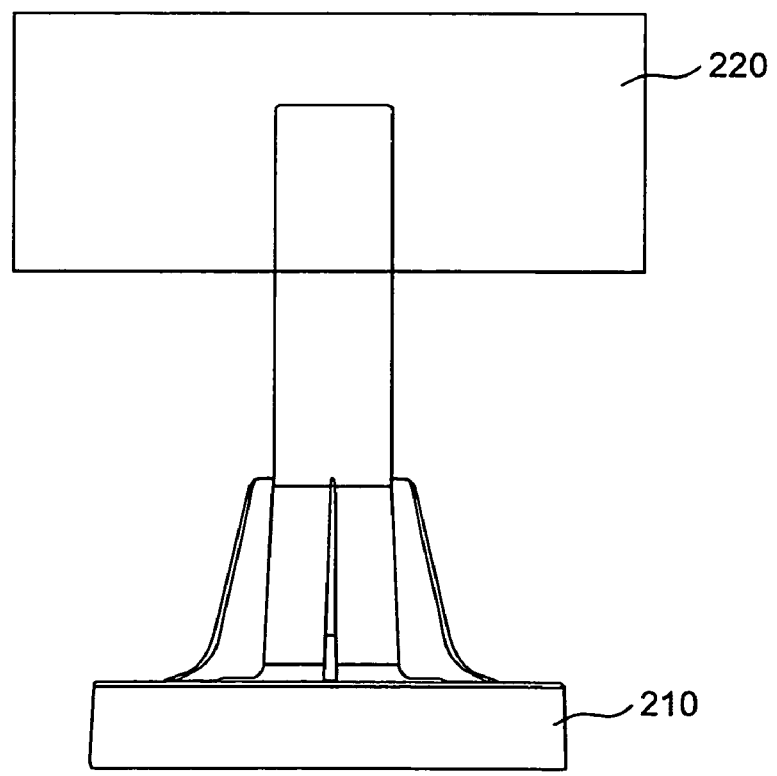

Referring to FIG. 6(a) and FIG. 7, initially, each positioning pin 310 on the mounting angle 220 is inserted into an opening provided in each boss 231 extending from the (plastic) front panel through the aluminum frame 230, thus determining the mounting positions. Then, the aluminum frame 230 is fastened with a screw. The aluminum frame 230 is fixed with screw only to such an extent that the mounting angle 220 can be slightly rotated relative to the aluminum frame 230 about the center of the screw in the fixing opening 321. This is followed by a temporary fixing of the other fixing openings 322 to 326. The temporary fixing is carried out with such a torque that the main body unit of the flat display apparatus is not inclined by its own weight.

Figure 6B:
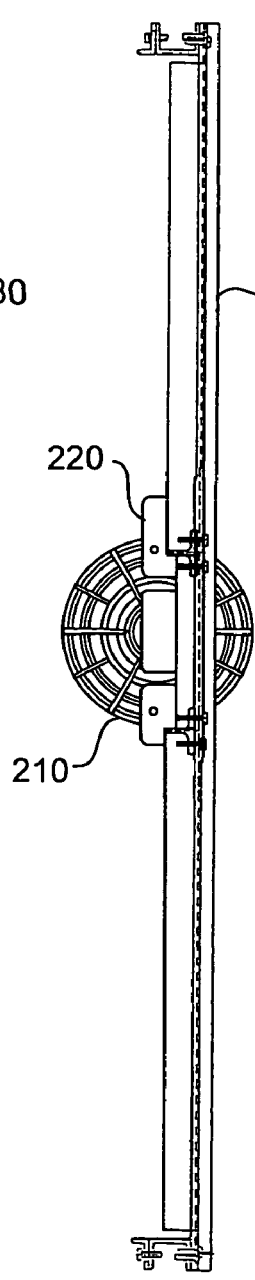
Figure 6C:
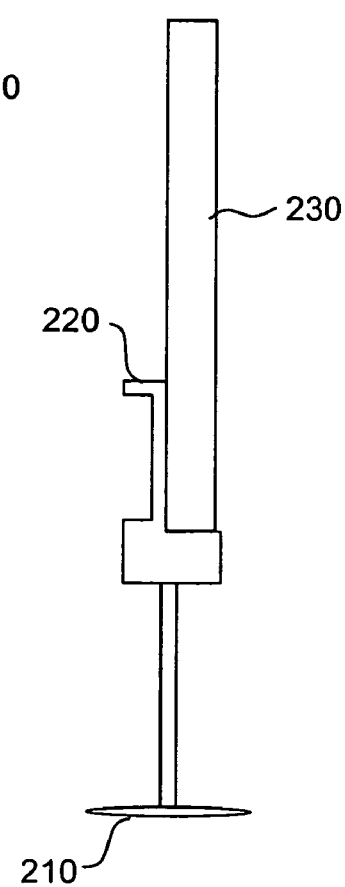

In the present embodiment, the mounting position of the rotation unit 210 and the aluminum frame 230 may preferably be modified as shown in FIG. 6(b). Such a modification can be effected by changing the design of the angle 220 or the positioning pin 310 in an appropriate manner. Further, an L-shaped mounting member may be used, as shown in FIG. 6(c).

Then, the mounting positions of the rotation unit 210, the mounting angle 220 and the aluminum frame 230 are finely adjusted. FIG. 7 shows a rear view of the rotation unit and mounting angle, similar to FIG. 3. In FIG. 7, however, an eccentric cam 341 is inserted into the position adjusting opening 331. FIGS. 7(a) and (b) show examples corresponding to FIGS. 1(a) and (b).

In the present embodiment, the eccentric cam 341 has an oval-shaped screw head. Thus, as the eccentric cam 341 is rotated, the diameter of the screw head in a vertical direction varies. In FIG. 7, as the eccentric cam 341 is rotated to the right, the screw head will have increasingly larger diameter in the vertical direction, so that the upper inner wall of the position adjusting opening 331 will be pushed upward by the eccentricity cam 341.

If the mounting angle 220 should be adjusted in the opposite direction, the eccentric cam 341 may be inserted into the position adjusting opening 332. By rotating the eccentric cam 341 to the left, the lower inner wall of the position adjusting opening 332 can be pushed downward.

The mounting angle is thus allowed to rotate slightly about the axis of the screw in the fixing opening 321. Accordingly, by finely adjusting the mounting positions of the rotation unit 210, mounting angle 220 and aluminum frame 230 while rotating the eccentric cam 341, the position of the display screen unit and main body unit of the flat display apparatus can be fine-adjusted to be horizontal.

After the fine adjustment is over, the fixing openings 322 to 326 that have been temporarily fastened are fully fastened with the screw, thus fully fixing the rotation unit 210, mounting angle 220 and aluminum frame 230 in place.

The shape of the eccentric cam 341 may be formed in various manners as long as it is asymmetric with respect to the rotation center. For example, the shape may be either oval or eccentric circle, and yet the cam with such a shape can still function as the above-described position adjusting mechanism.

The mounting positions of the fixing openings 321 to 326 and the position adjusting openings 331 and 332 on the mounting angle 220 shown in FIGS. 3 and 7 are merely exemplary and various other examples are possible.

For example, while in the above description the mounting position of the display screen unit and the main body unit is finely adjusted by manually rotating the eccentric cam 341, the fine adjustment may be carried out automatically. In such a case, an appropriate electric position adjusting means may be provided.

The position adjusting mechanism in the stand-supported portion of the stand-type flat display apparatus as described above can be applied to all kinds of equipment supported by a stand.

SECOND EMBODIMENT

Flat Display Apparatus Equipped with a Rotation-Axle Bearing Mechanism

The rotation-axle bearing mechanism of the flat display apparatus according to the present embodiment is used in the stand-supported portion of the stand-type flat display apparatus shown in FIGS. 1 and 2. The rotation-axle bearing mechanism is built inside the rotation unit 210.

Figure 8:
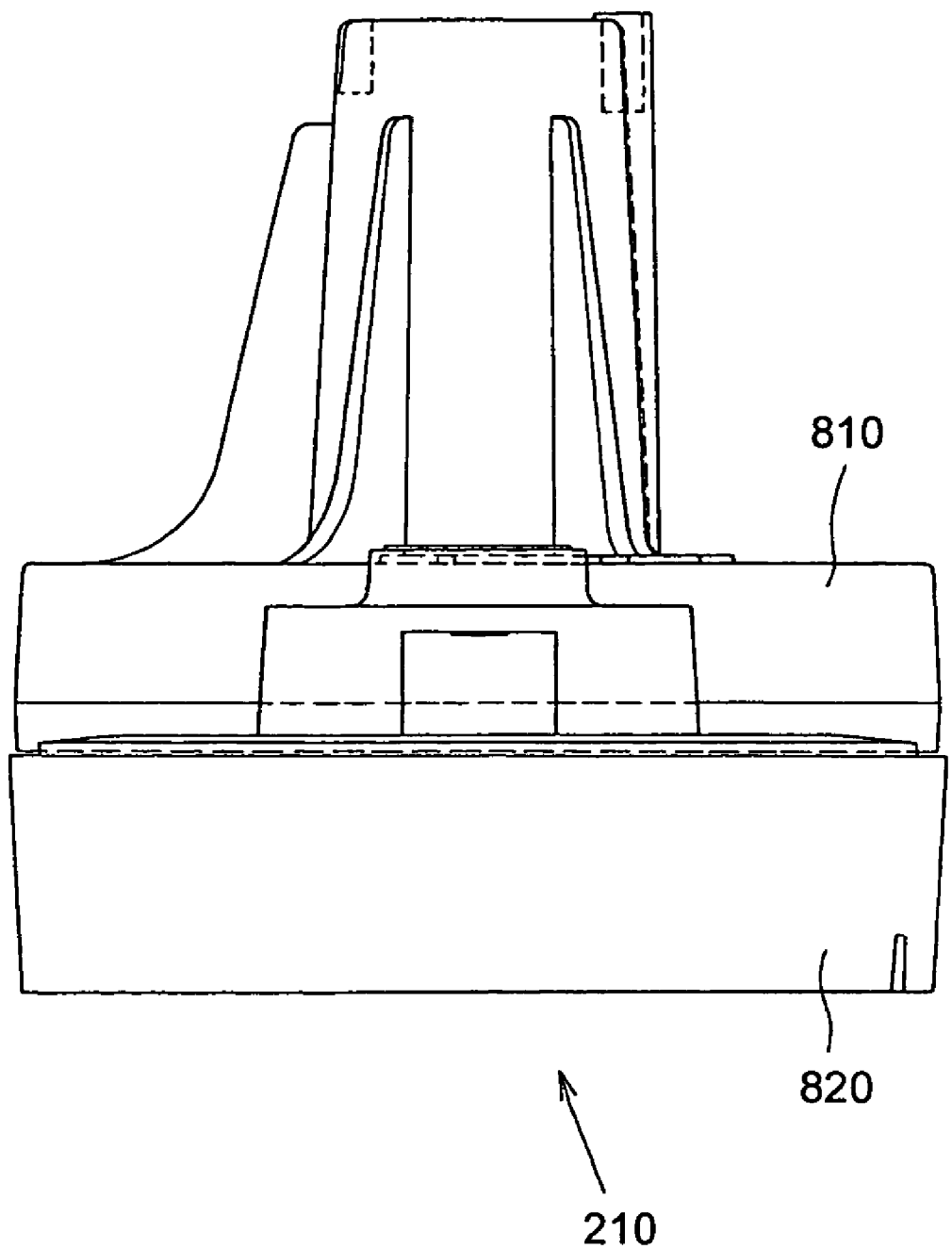
FIG. 8 shows a rotation-axle bearing mechanism in a stand-type flat display apparatus according to a second embodiment of the invention.

FIG. 8 shows the rotation unit 210 comprising the rotation mechanism according to the present embodiment. The rotation unit 210 is comprised of an upper unit 810 and a lower unit 820. The upper and lower units are adapted to rotate relative to one another with a predetermined rotation torque. The upper unit 810 is secured to the aluminum frame 230 via the mounting angle 220, and the lower unit 820 is secured to the stand base 132.

Figure 9:
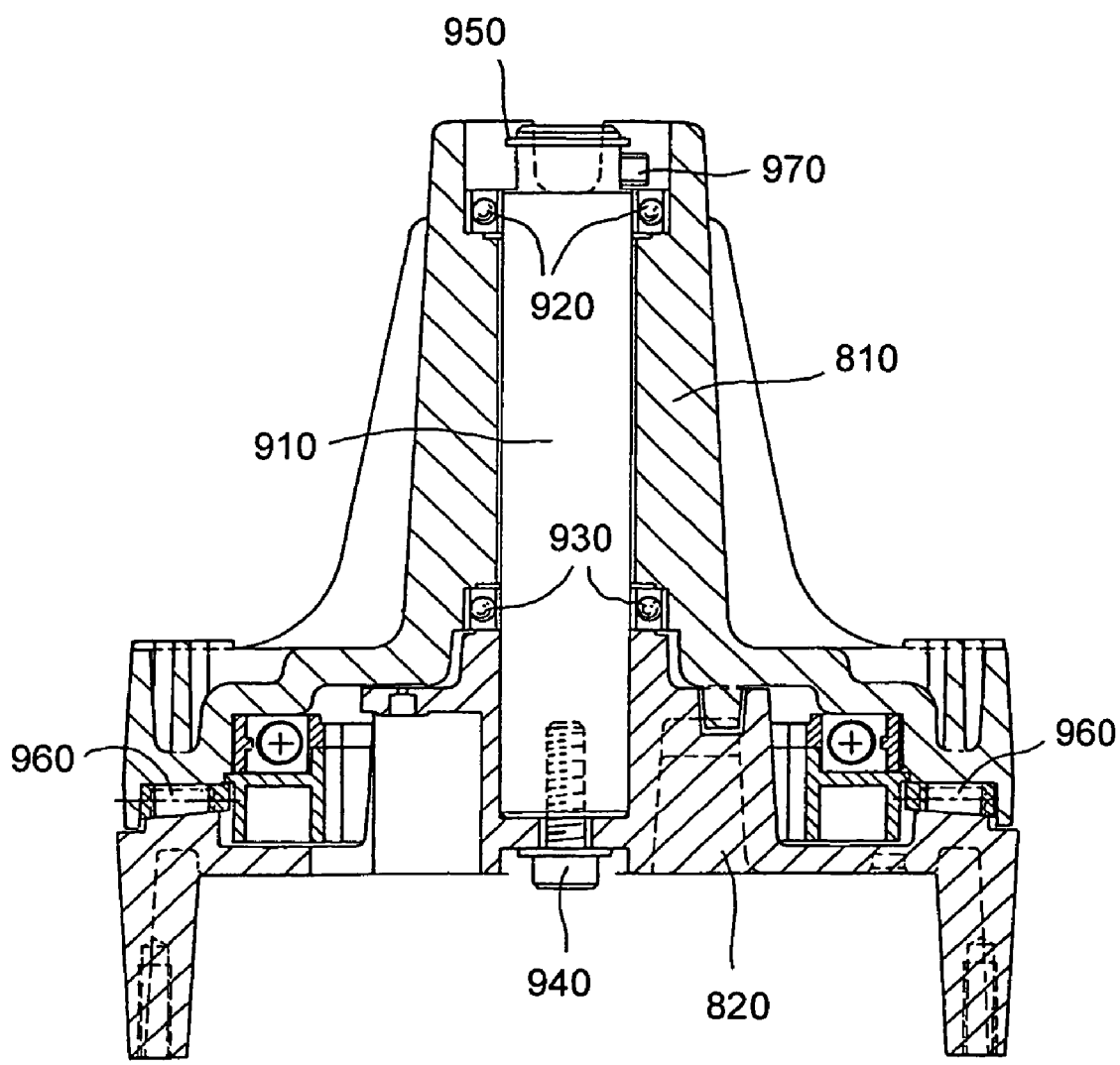
FIG. 9 shows a front elevational cross-section of the rotation unit used in the rotation-axle bearing mechanism in the stand-type flat display apparatus according to the second embodiment.
Figure 10:
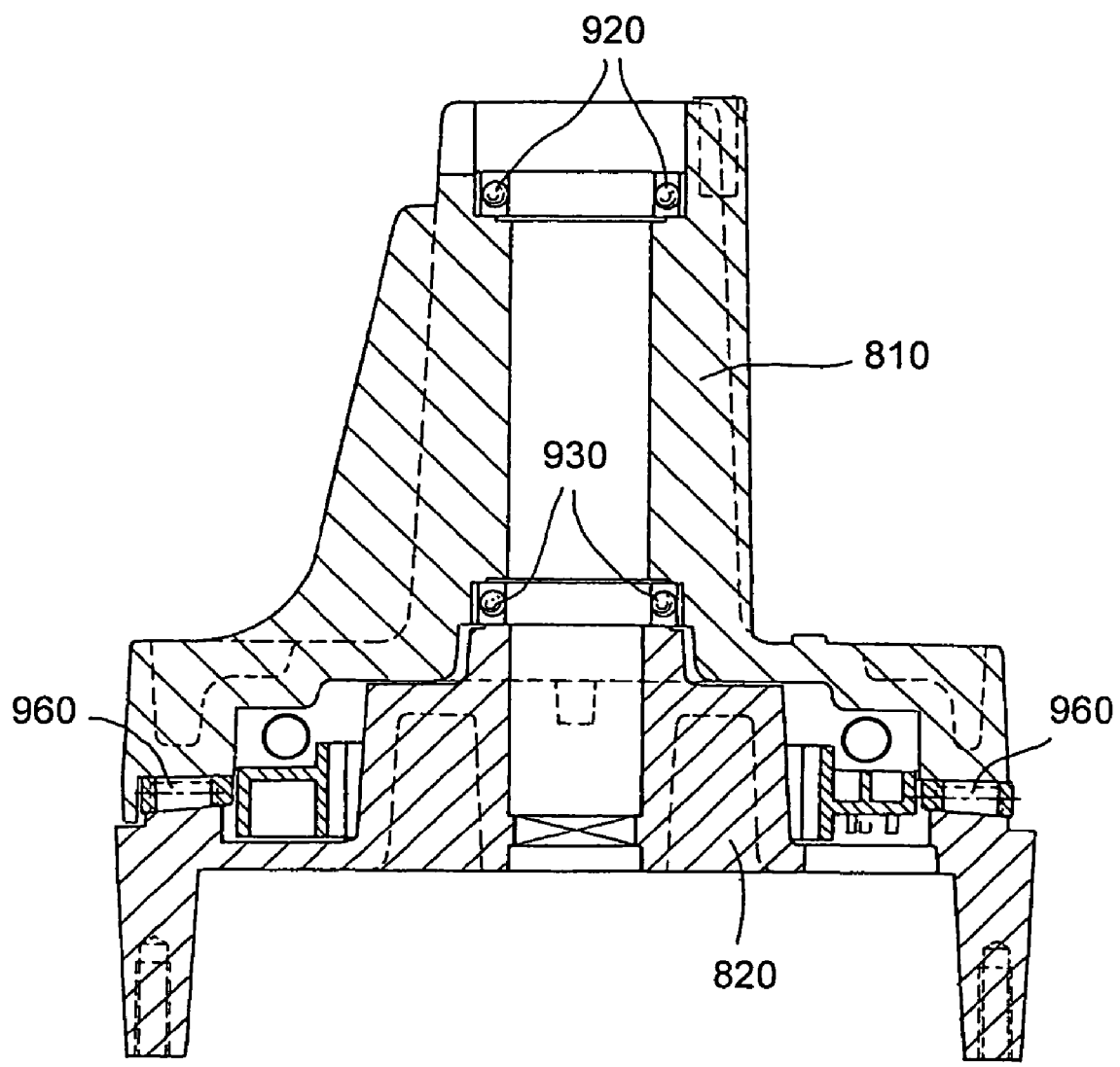
FIG. 10 shows a lateral cross-section of the rotation unit used in the rotation-axle bearing mechanism in the stand-type flat display apparatus according to the second embodiment.
Figure 11:
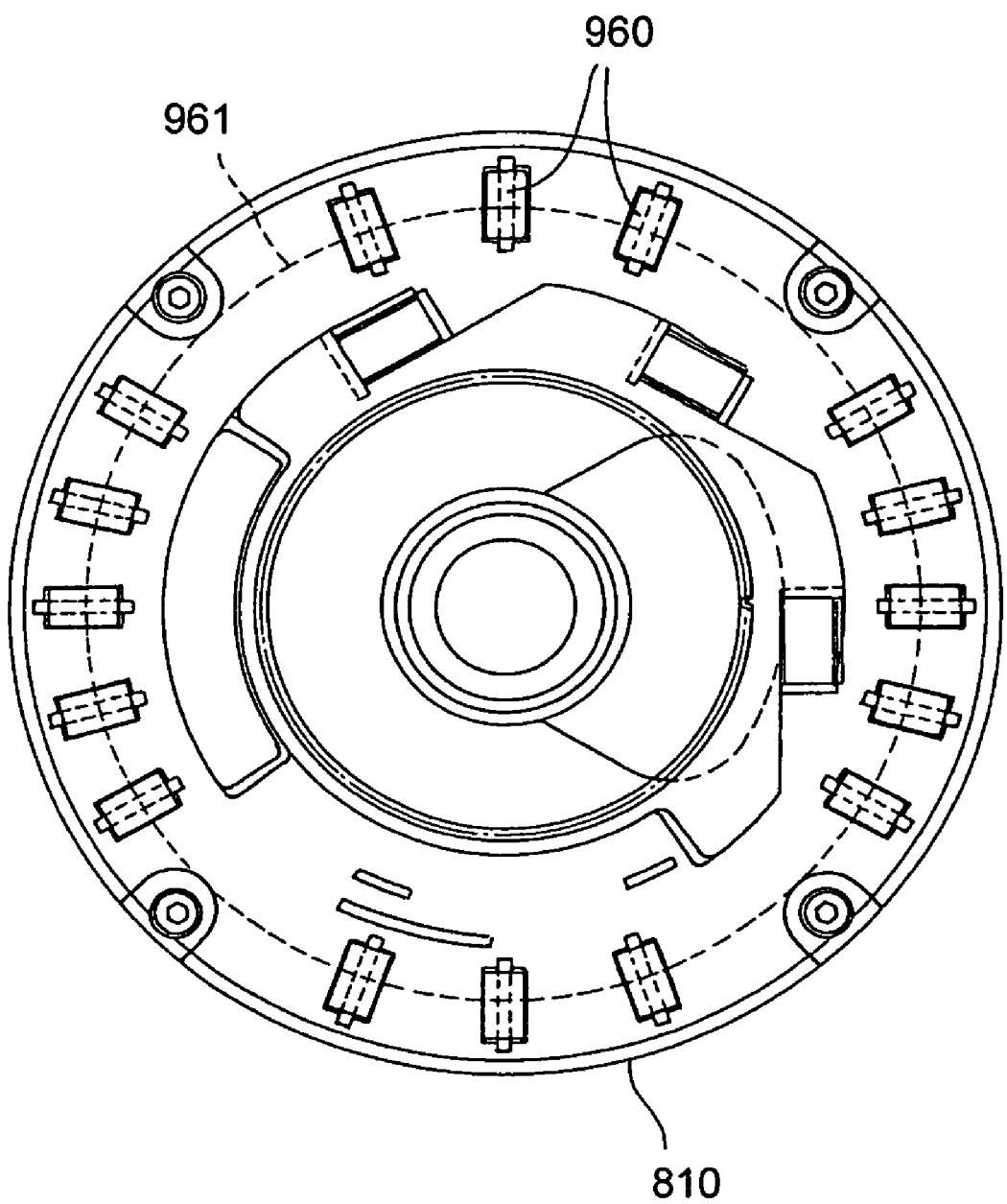
FIG. 11 is a bottom view of an upper unit of the rotation unit used in the rotation-axle bearing mechanism in the stand-type flat display apparatus according to the second embodiment.
Figure 12:
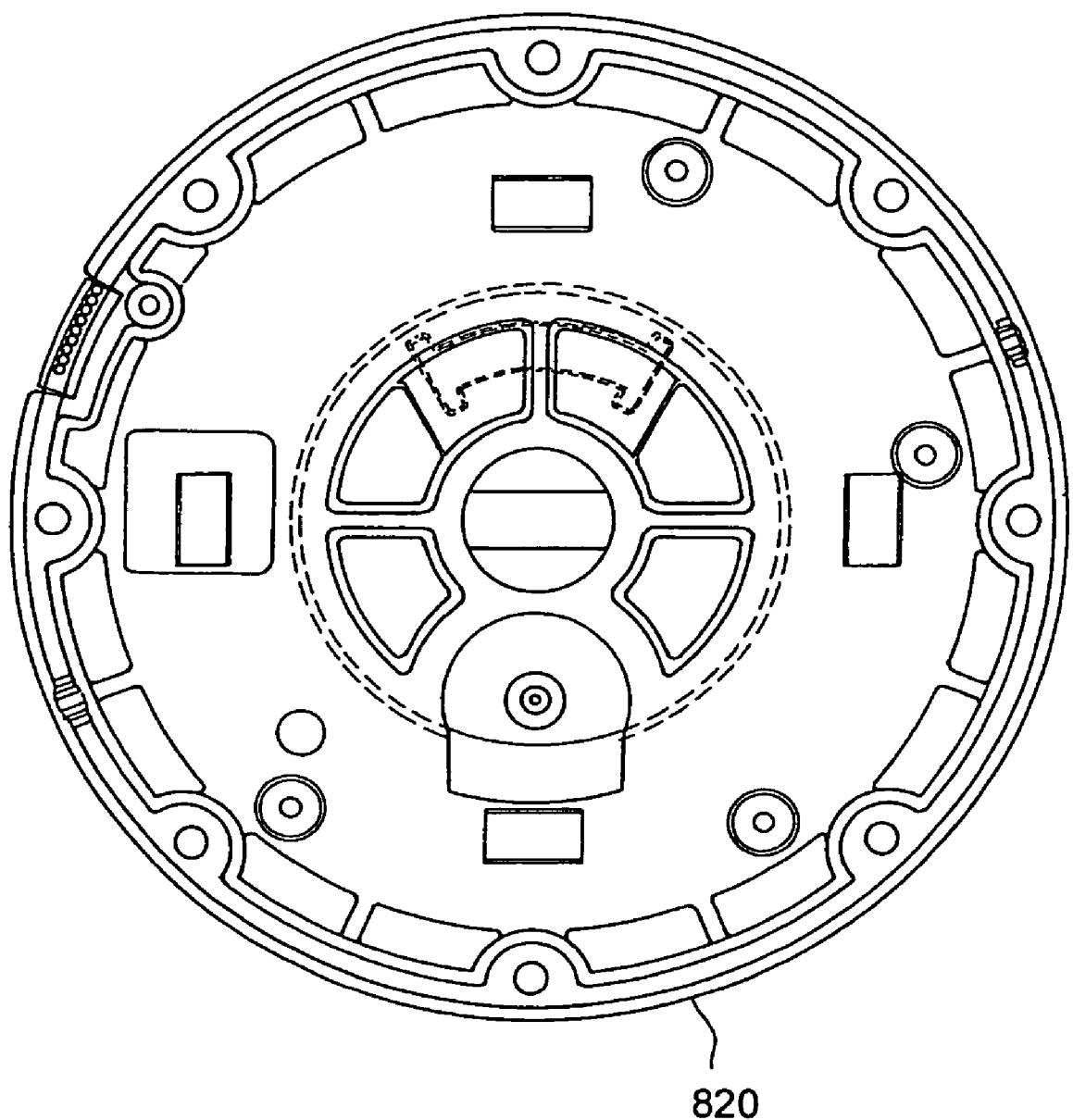
FIG. 12 is a top view of an upper unit of the rotation unit used in the rotation-axle bearing mechanism in the stand-type flat display apparatus according to the second embodiment.

FIG. 9 shows a cross-sectional front elevation of the rotation unit 210. FIG. 10 shows a cross-sectional side elevation of the same unit. FIG. 11 shows a bottom view of the upper unit 810 of the rotation mechanism of the present embodiment. FIG. 12 shows a top view of the lower unit 820 of the rotation mechanism of the embodiment.

In the rotation mechanism shown in FIGS. 9 and 10, the lower unit 820 has a rotation axle 910 secured thereto. The upper unit 810 includes an upper ball bearing 920 and a lower ball bearing 930 that constitute radial bearings for the rotation axle 910. The lower end of the rotation axle 910 is fastened to the lower unit 820 with a bolt 940. The upper end of the rotation axle 910 is anchored to a bearing portion of the upper unit 810 via a washer 950.

The rotation mechanism of the present embodiment further includes a plurality of rollers 960 arranged between the upper and lower units along a circumference that is coaxial with the rotation axle 910 at predetermined intervals. Each of the rollers 960 are adapted to roll in contact with the upper surface of the lower unit 820, thus functioning as a thrust bearing.

Thus, the rotation mechanism of the present embodiment includes two types of bearings, namely the radial bearing consisting of the upper ball bearing 920 and the lower ball bearing 930, and the thrust bearing consisting of the rollers 960. The rotation mechanism with such a structure receives a thrust load mainly with the thrust bearing while receiving a radial load mainly with the radial bearing, thereby allowing for a smooth and stable rotation even if the center of gravity is not located on the rotation axis, as in the case of a flat display apparatus.

This structure consisting of a thrust bearing and a radial bearing is particularly effective when the center of gravity of the flat display apparatus is located outside the reference rotation circumference (referring to the circumference on which the center of each roller 960 in the radius direction is positioned; namely, circumference 961 in FIG. 11) of the radial bearing. This is because of the fact that such a displacement of the center of gravity with respect to the axle that cannot be covered by the thrust bearing can only be covered by the radial bearing, thus providing a smooth rotation.

Thus, by employing the above-described rotation mechanism in the flat display apparatus, a smooth rotation can be obtained in the flat display apparatus even when the display screen unit is disposed forwards outside the periphery of the thrust bearing.

In accordance with the present embodiment, a stopper (or collar) 970 is provided in an upper part of the upper unit 810 for retaining the rotation axle 910. The stopper 970 is fastened to the rotation axle 910 with a screw (not shown) provided on the side of the collar after the rotation axle 910 is secured in place by the bolt 940, while applying a certain pressure on the stopper 970. Thereafter, the washer 950 is attached to the upper end of the axle in order to prevent the dropping of the stopper 970. Specifically, the stopper 970 is fastened with screw while pressuring the stopper with a predetermined weight (about 10 kg) (which is referred to as a "fixed position pressurization"). As a result, the wobbling of the rotation axle in the vertical direction can be eliminated, thus providing a smoother and more stable rotation.

The foregoing description of the rotation-axle bearing mechanism used in the stand-supported portion of the stand-type flat display apparatus is merely exemplary. Thus, various known techniques can be used in support of the structures of the radial bearing and thrust bearing in the rotation-axle bearing mechanism.

THIRD EMBODIMENT

Flat Display Apparatus Equipped with a Rotation-Speed Reduction Mechanism

The rotation-speed reduction mechanism of the flat display apparatus according to the present embodiment is used at the stand-supported portion of the stand-type flat display apparatus shown in FIGS. 1 and 2. The rotation-speed reduction mechanism is build inside the rotation unit 210.

Figure 13:
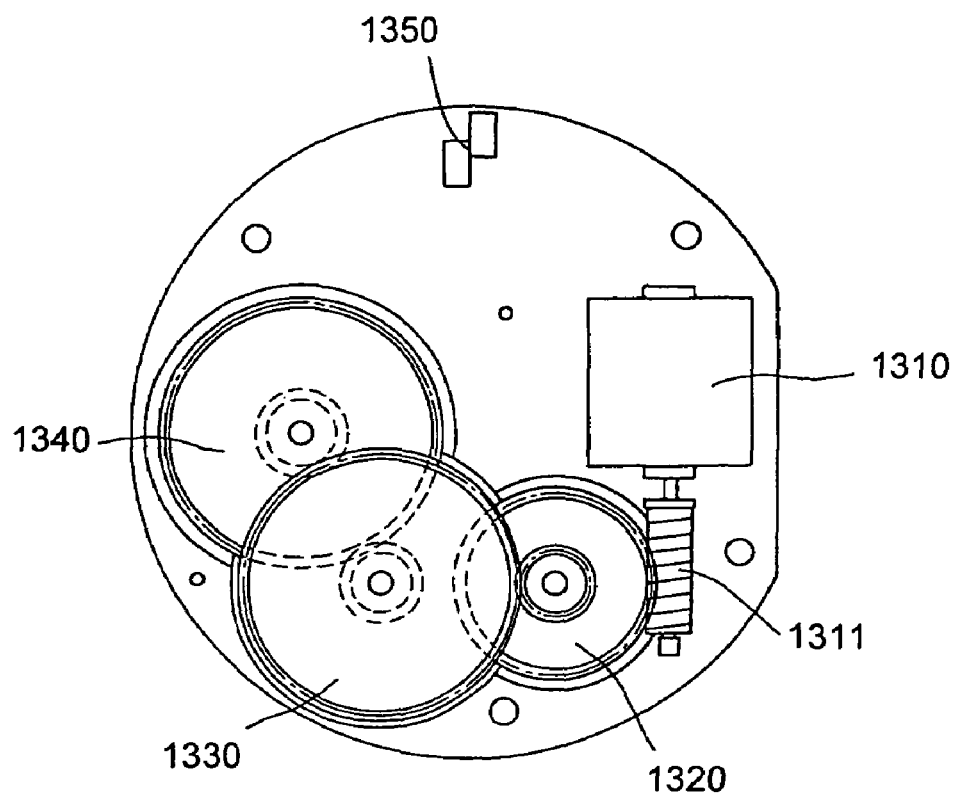
FIG. 13 is a plan view showing the internal structure of a rotation speed reduction mechanism of a stand-type flat display apparatus according to a third embodiment of the invention.

FIG. 13 shows a cross section of the rotation unit 210, in which the rotation mechanism used in the stand-type flat display apparatus of the present embodiment is included. In FIG. 13, the rotation mechanism includes a drive motor 1310, a worm 1311, a first gear 1320, a second gear 1330, a third gear 1340 and a position sensor 1350. The drive motor 1310 is an electric motor. The worm 1311, first gear 1320, second gear 1330 and third gear 1340 are made of plastic, for example.

Figure 14:
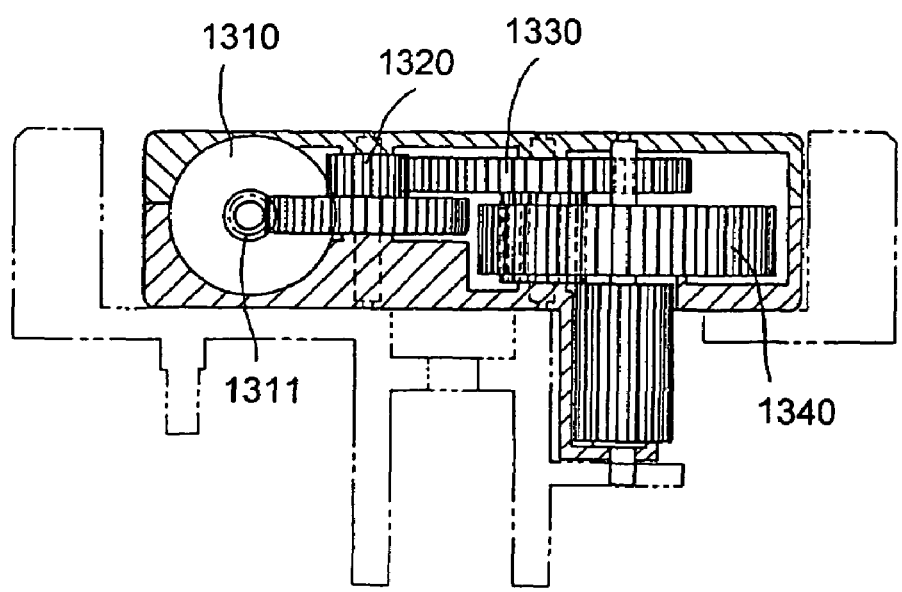
FIG. 14 shows a lateral cross-section of the rotation speed reduction mechanism of a stand-type flat display apparatus according to a third embodiment of the invention, showing the internal structure thereof.

FIG. 14 shows a lateral cross section of the rotation mechanism. As will be seen from the figure, the worm 1311 engages with a lower gear of the first gear 1320. An upper gear of the first gear 1320 engages with an upper gear of the second gear 1330. A lower gear of the second gear 1330 engages with an upper gear of the third gear 1340. A lower gear of the third gear 1340 is used as an output gear.

In the rotation mechanism employed in the stand-type flat display apparatus of the present embodiment, the first gear 1320 is adapted to function as a torque-limiting gear for reducing the speed of rotation. The structure of the first gear 1320 is shown in detail in an enlarged cross-section of FIG. 15. As shown FIG. 15, the first gear 1320 is made up of a gear base 1321, an upper gear 1322, a lower gear 1323, a spring 1324, and a friction member 1325.

The upper gear 1322 is fixed to a gear base 1321 and thus integrated therewith. The lower gear 1323 is mounted on an axle portion of the gear base 1321 in a freely rotatable manner. The spring 1324 is made of conventional metal, for example, and it is adapted to put pressure on the upper gear 1322 and the lower gear 1323 at all times. The friction member 1325 is made of felt, for example, and is fixedly attached to the gear base 1321 by glue, for example, and thus integrated therewith. The friction member 1325 produces a predetermined level of friction between the gear base 1321 and the lower gear 1323.

The thus-structured rotation mechanism in the stand-type flat display apparatus according to the present embodiment operates as follows.

Referring to FIG. 13, as the drive motor 1310 is driven, the worm 1311 rotates. The rotation of the worm 1311 is transmitted to the first gear 1320, second gear 1330, and third gear 1340 successively, and then outputted from the lower gear of the third gear 1340.

It is now assumed that a rotation load has been applied to a stand-type flat television set according to the present embodiment during its automatic rotation in a direction opposite to the direction of automatic rotation, due to an obstacle or someone's hand. The rotation load is successively transmitted from the lower gear of the third gear 1340 to the second gear 1330 and then to the first gear 1320. If the rotation load put on the first gear 1320, which is a torque-limiting gear, is greater than a predetermined level, a clutch mechanism in the first gear 1320 is activated to reduce the rotation load, as will be described below.

Figure 15:
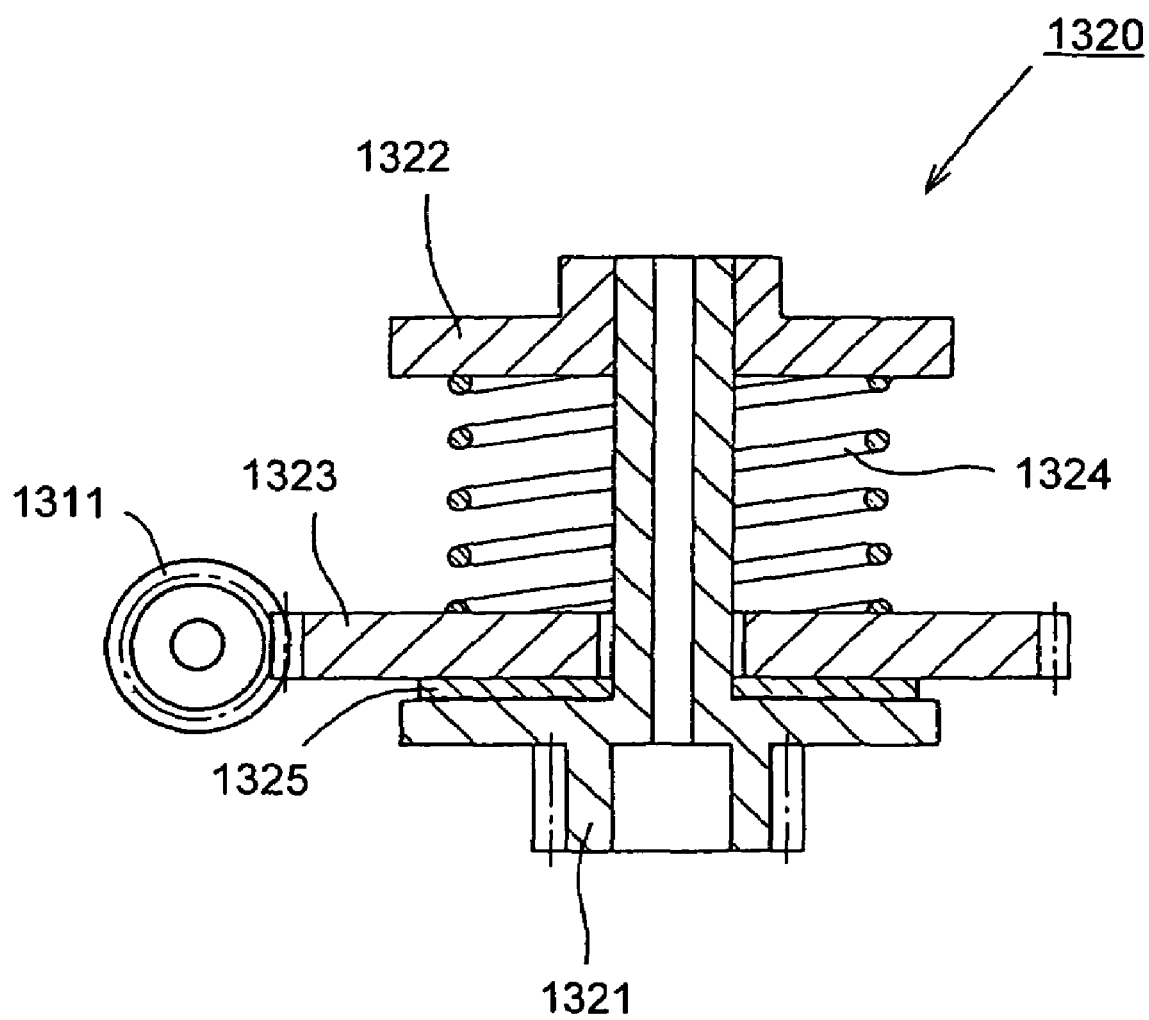
FIG. 15 is an enlarged cross-section of a torque-limiting gear included in the rotation speed reduction mechanism of a stand-type flat display apparatus according to a third embodiment of the invention.

Referring to FIG. 15, the gear base 1321 and lower gear 1323 of the first gear 1320 are adapted to frictionally slide on one another via the friction member 1325. When the drive motor 1310 is being driven and the rotation mechanism is normally executing an automatic rotation, a static frictional force is produced between the friction member 1325 and the lower gear 1323. As a result, the rotation of the worm 1311 is transmitted to the gear base 1321 and the upper gear 1322 without loss.

However, if a rotation load in excess of the static frictional force between the friction member 1325 and the lower gear 1323 is applied, the lower gear 1323 rotates while frictionally sliding on the friction member 1325. As a result, the rotation load transmitted from the lower gear of the third gear 1340 is reduced between the friction member 1325 and the lower gear 1323. Thus, in this mechanism, no load in excess of the kinetic friction between the friction member 1325 and the lower gear 1323 would be transmitted to the drive motor 1310 no matter how much rotation load is put on the third gear from the outside.

Accordingly, the rotation drive force produced by the drive motor 1310 is never on a collision course with an excessive rotation force applied externally to the rotation mechanism during automatic rotation. Thus, the individual components of the rotation mechanism are spared of any excessive load.

It is possible that an excessive rotation load is applied manually by the user when the rotation unit is at rest. In such a case too, the rotation load applied via the third gear 1340 can be reduced by the first gear 1320, so that the individual components are not subject to the excessive load.

In the rotation mechanism in the stand-type flat display apparatus of the present embodiment, the coefficient of friction between the gear base 1321 and lower gear 1323 of the first gear 1320 can be adjusted by adjusting the force of the spring 1324. Alternatively, the frictional coefficient can be obviously adjusted by selecting the material of the friction member 1325.

The stand-type flat display apparatus according to the present embodiment is further equipped with a position sensor 1350 at the rotation mechanism portion. The position sensor 1350 is used to detect the current rotation position by monitoring the inner wall of the rotation unit.

Preferably, when the stand-type flat display apparatus of the present embodiment is actually installed at home, for example, the rotation mechanism should have a rotation torque such that the display screen unit would not be rotated by a blow of wind but can be rotated when the user applies a gentle rotational pressure. For example, the friction member 1325 and the lower gear 1323 should preferably start sliding on one another upon application of a load of approximately 1.5 kg.

While the rotation-speed reduction mechanism in the stand-supported portion of the stand-type flat display apparatus has been described by way of an embodiment, various modifications or variations can be added to the embodiment. For example, the torque-limiting gear does not necessarily have to be the first gear 1320, and so either the second or the third gear may be adapted to function as the torque-limiting gear. Alternatively, more than one torque-limiting gear may be provided in the rotation mechanism.

CONCLUSION

While the position adjusting mechanism, rotation-axle bearing mechanism and rotation-speed reduction mechanism of the invention have been particularly shown and described with reference to specific embodiments thereof, it will be understood to those skilled in the art that various modifications or improvements in structure and/or function can be made without departing from the spirit or scope of the invention.

INDUSTRIAL APPLICABILITY

In accordance with the position adjusting mechanism of the invention, the positioning of the display screen unit of a stand-type flat display apparatus equipped with a rotation mechanism can be finely adjusted such that the display screen unit can be held horizontally.

In accordance with the rotation-axle bearing mechanism of the invention, a smooth and stable rotation can be obtained in a stand-type flat display apparatus even if the center of gravity of the display screen unit and main body unit of the flat display apparatus is displaced from the center of rotation of the stand-rotation mechanism.

Further, in accordance with the rotation-speed reduction mechanism of the invention for a stand-type flat display apparatus, the individual components in a stand of the apparatus can be protected from an excessive or abnormal rotation load during the rotation of the stand.

The flat display apparatus according to the invention can be applied to stand-type flat display apparatuses equipped with a display screen unit such as an LCD, plasma or EL display.

Particularly, the invention is suitable for stand-type flat display apparatuses for business or household purposes equipped with a large-sized display screen.

The invention claimed is:

1. A flat display apparatus comprising
a main body unit with a display screen,
a stand unit,
a rotation mechanism for rotating the main body unit horizontally with respect to the stand unit,
the rotation mechanism further comprising a torque-limiting gear, wherein the transmission of a rotation load is reduced as an upper gear and a lower gear of the torque-limiting gear frictionally slide upon one another,
wherein the torque-limiting gear includes a gear base to which the upper gear is secured, and wherein the lower gear is disposed between the gear base and the upper gear wherein the resilient member is disposed between the upper and lower gears, the resilient member being adapted to press the lower gear against the friction member such that the lower gear and the gear base frictionally slide upon one another to reduce the transmission of a rotation load, and
wherein the rotation mechanism is adapted to reduce the transmission of a rotation load upon application of a rotation load exceeding a certain level.

2. The flat display apparatus according to claim 1, wherein the rotation mechanism comprises two or more gears, of which two or more gears are torque-limiting gears that are adapted to reduce the transmission of a rotation load upon application of a rotation load exceeding a certain level.

3. The flat display apparatus according to claim 2, wherein the torque-limiting gears include an upper gear and a lower gear, wherein the upper and lower gears are adapted to reduce the transmission of a rotation load by frictionally slide upon one another upon application of a rotation load exceeding a certain level.

4. The flat display apparatus according to claim 2, wherein the torque-limiting gears include a gear base, an upper gear secured to the gear base, and a lower gear disposed between the gear base and the upper gear, wherein the gear base has a friction member disposed on the surface thereof facing the lower gear, and wherein a resilient member is disposed between the upper and lower gears, the resilient member being adapted to press the lower gear against the friction member such that the lower gear and the gear base frictionally slide upon one another to reduce the transmission of a rotation load.

5. The flat display apparatus according to claim 1, wherein the rotation mechanism includes a drive motor and is capable of automatic rotation.

6. The flat display apparatus according to claim 5, further comprising means for receiving remote operation, wherein the rotation of the rotation mechanism is controlled by remote operation.

7. The flat display apparatus according to claim 1, wherein the rotation mechanism includes a position sensor and is capable of recognizing its own rotation position.

8. The flat display apparatus according to claim 1, wherein the rotation mechanism is adapted to reduce the speed of rotation between a motor and the gears or between the gears.

9. The flat display apparatus according to claim 1, wherein the display screen includes a liquid crystal display, a plasma display, or an EL display.

* * * * *